United States Patent
Smith

(10) Patent No.: US 8,693,679 B1
(45) Date of Patent: Apr. 8, 2014

(54) COMMUNICATIONS SYSTEM AND ASSOCIATED METHOD FOR REDUCING POWER CONSUMPTION OF A TELECOMMUNICATIONS DEVICE

(75) Inventor: Brian Christian Smith, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 769 days.

(21) Appl. No.: 12/841,238

(22) Filed: Jul. 22, 2010

(51) Int. Cl.
 *H04M 19/00* (2006.01)
 *H03F 3/30* (2006.01)
 *G11C 16/10* (2006.01)

(52) U.S. Cl.
 USPC .............. 379/413; 323/211; 326/38; 330/51; 330/69; 330/257; 340/7.32; 345/92; 345/212; 361/93.1; 361/102; 365/185.11; 365/189.11; 365/227; 375/222; 375/258; 375/260; 379/387.01; 455/343.1; 455/415; 455/426.1; 711/211; 713/300; 713/320; 713/323

(58) Field of Classification Search
 USPC ............. 323/211; 330/51, 69, 257; 340/7.32; 345/92, 212; 365/185.11, 189.11, 227; 375/222, 258, 260; 379/387.01, 413; 713/300, 320, 323; 326/38; 361/93.1, 361/102; 455/343.1, 415, 426.1; 711/211
 See application file for complete search history.

(56) References Cited

U.S. PATENT DOCUMENTS

| | | | |
|---|---|---|---|
| 5,357,394 A | | 10/1994 | Piney |
| 5,436,864 A | * | 7/1995 | Koh et al. ................ 365/189.11 |
| 5,568,042 A | * | 10/1996 | Nyberg et al. ................ 323/211 |
| 5,943,613 A | * | 8/1999 | Wendelrup et al. ........ 455/343.1 |
| 5,982,596 A | | 11/1999 | Spencer et al. |
| 5,999,451 A | * | 12/1999 | Lin et al. .................. 365/185.11 |
| 6,151,667 A | * | 11/2000 | Walters ........................ 711/211 |
| 6,157,816 A | * | 12/2000 | Anderson et al. ............ 340/7.32 |
| 6,195,243 B1 | | 2/2001 | Spencer et al. |
| 6,300,828 B1 | | 10/2001 | McInnis ...................... 330/124 |
| 6,333,654 B1 | | 12/2001 | Harris et al. .................. 327/170 |
| 6,359,505 B1 | * | 3/2002 | Joffe ............................ 330/69 |
| 6,411,163 B1 | * | 6/2002 | Enriquez ..................... 330/257 |
| 6,426,617 B1 | | 7/2002 | Haensgen |
| 6,466,088 B1 | * | 10/2002 | Rezvani et al. ................ 330/51 |
| 6,473,281 B1 | | 10/2002 | Kornblit |
| 6,704,181 B2 | | 3/2004 | Saksa .............................. 361/64 |
| 6,728,368 B1 | | 4/2004 | Mohajeri ..................... 379/377 |
| 6,819,620 B2 | * | 11/2004 | Lin et al. ..................... 365/227 |
| 6,895,041 B1 | * | 5/2005 | Mccullough et al. ......... 375/222 |

(Continued)

OTHER PUBLICATIONS

Non-Final Office Action issued in U.S. Appl. No. 12/841,198 on Sep. 19, 2012, 11 pages.

(Continued)

*Primary Examiner* — Gerald Gauthier
(74) *Attorney, Agent, or Firm* — Fish & Richardson P.C.

(57) ABSTRACT

A communications system includes a communications device having a plurality of access modules each having a port and connected to a communications line and a plurality of transmitters with the respective transmitter associated in one-to-one correspondence with the communications line of an access module. Each transmitter has a line driver and is configured to couple communications signals to a respective communications line. A voltage source is connected to the line drivers and configured to provide a bias voltage to the line drivers that varies depending on a selected minimum power level. A controller is connected to the voltage source and has logic configured to change the bias voltage to the line drivers. The controller is responsive to a minimum data rate for each bias voltage.

22 Claims, 15 Drawing Sheets

(56) References Cited

U.S. PATENT DOCUMENTS

| | | | |
|---|---|---|---|
| 6,937,720 B2 | 8/2005 | Casier et al. | 379/399.01 |
| 6,947,554 B2 * | 9/2005 | Freyman et al. | 379/413 |
| 7,058,823 B2 * | 6/2006 | Lapidus | 713/300 |
| 7,102,382 B2 * | 9/2006 | Drenth et al. | 326/38 |
| 7,130,412 B2 * | 10/2006 | Joffe et al. | 379/387.01 |
| 7,443,977 B1 | 10/2008 | Toumani et al. | 379/399.01 |
| 7,472,293 B2 * | 12/2008 | Kuhlmann et al. | 713/300 |
| 7,496,145 B2 * | 2/2009 | Greenwood et al. | 375/260 |
| 7,570,470 B2 | 8/2009 | Holley | 361/64 |
| 7,899,433 B2 * | 3/2011 | Lee et al. | 455/343.1 |
| 8,135,550 B2 | 3/2012 | Bose et al. | |
| 8,161,307 B2 * | 4/2012 | Archer et al. | 713/320 |
| 8,188,994 B2 * | 5/2012 | Tada et al. | 345/212 |
| 8,190,936 B2 * | 5/2012 | Chen et al. | 713/323 |
| 8,242,996 B2 * | 8/2012 | Lee | 345/92 |
| 8,254,563 B2 | 8/2012 | Pan et al. | |
| 8,271,810 B1 * | 9/2012 | Fliesler et al. | 713/300 |
| 8,279,951 B2 * | 10/2012 | Stolle | 375/258 |
| 8,370,661 B2 * | 2/2013 | Archer et al. | 713/320 |
| 8,564,920 B1 * | 10/2013 | Smith et al. | 361/93.1 |
| 8,564,922 B1 * | 10/2013 | Smith et al. | 361/102 |
| 2003/0030954 A1 | 2/2003 | Bax et al. | |
| 2003/0048007 A1 | 3/2003 | Mercier et al. | |
| 2003/0093701 A1 * | 5/2003 | Freyman et al. | 713/300 |
| 2005/0200382 A1 * | 9/2005 | Drenth et al. | 326/38 |
| 2006/0221532 A1 | 10/2006 | Fuller | |
| 2007/0072578 A1 * | 3/2007 | Lee et al. | 455/343.1 |
| 2008/0167755 A1 | 7/2008 | Curt | 700/293 |
| 2008/0204947 A1 | 8/2008 | Shea et al. | |
| 2009/0098869 A1 * | 4/2009 | Torrance et al. | 455/426.1 |
| 2009/0199032 A1 * | 8/2009 | Chen et al. | 713/323 |
| 2010/0097733 A1 | 4/2010 | Tomimbang | |
| 2010/0145641 A1 | 6/2010 | Bose et al. | |
| 2011/0159859 A1 * | 6/2011 | Kouchri | 455/415 |

OTHER PUBLICATIONS

Non-Final Office Action issued in U.S. Appl. No. 12/841,218 on Oct. 23, 2012, 10 pages.

Notice of Allowance issued in U.S. Appl. No. 12/841,218 on Feb. 14, 2013, 9 pages.

Final Office Action issued in U.S. Appl. No. 12/841,198 on Mar. 18, 2013 15 pages.

* cited by examiner

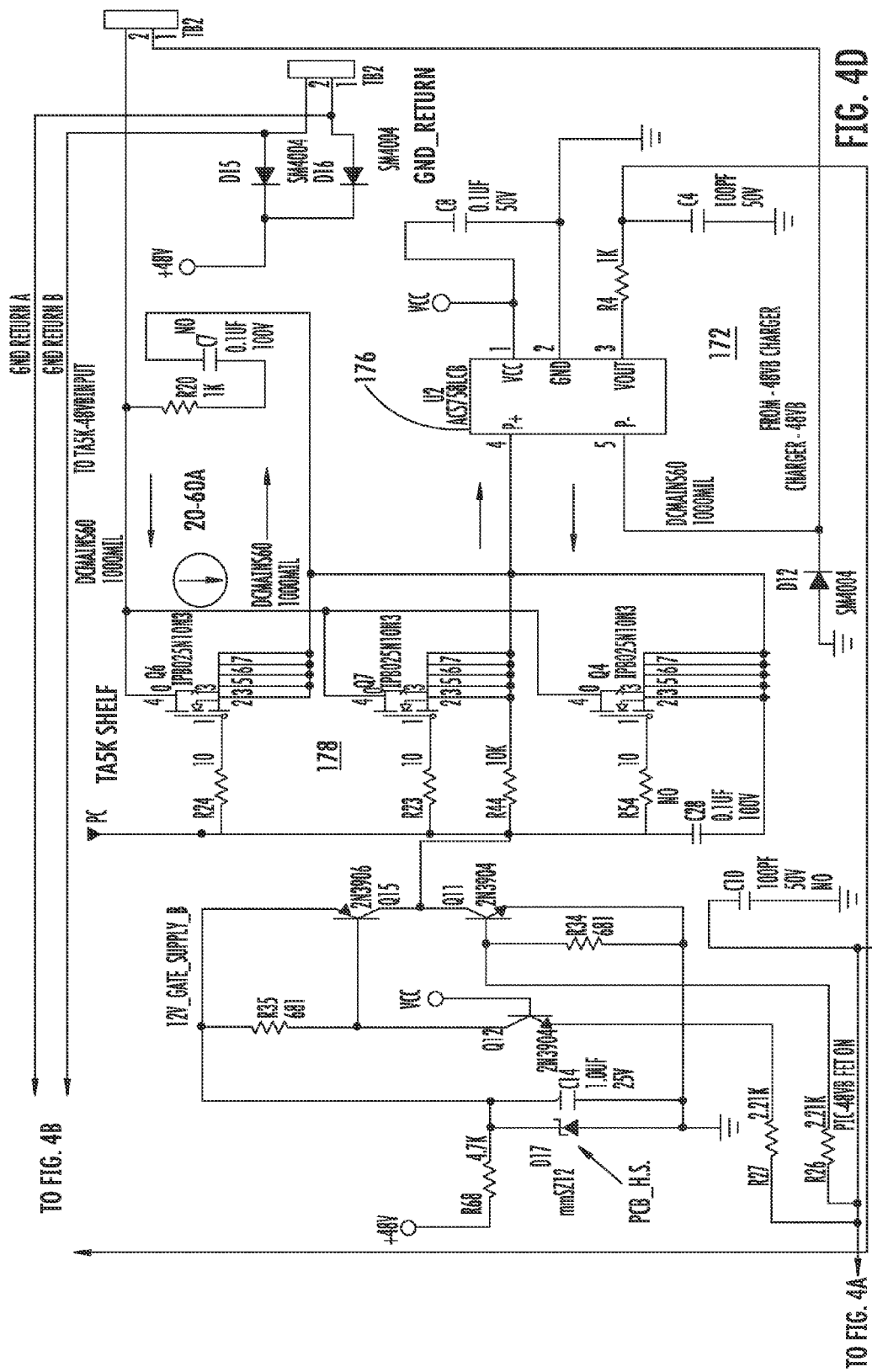

COMMUNICATIONS SYSTEM AND ASSOCIATED METHOD FOR REDUCING POWER CONSUMPTION OF A TELECOMMUNICATIONS DEVICE

FIELD OF THE INVENTION

The present invention relates to protecting electrical devices, for example, in telecommunications systems, and reducing power consumption in a telecommunication device.

BACKGROUND OF THE INVENTION

A telecommunications device, for example, a telecommunications aggregation element such as a DSLAM (Digital Subscriber Line Access Module), typically has multiple line card slots that receive a number of DSL (Digital Subscriber Line) modems each typically formed as a separate line card. When only a portion of the card slots have modems, the device is not fully populated. The amount of electrical power required by the device is approximately proportional to the number of modems installed in the device. Conventional fault protection systems are used with such devices to reduce excess currents that may damage components in the device. These conventional fault protection systems typically include one or more circuit breakers having a trip point (a disconnect current value) that is chosen based on the device being fully populated with modems and other circuit devices.

Such conventional protection systems using circuit breakers typically have not worked well if the telecommunications device is partially populated with modems, and in particular, if there are a smaller number of slots populated with modems or similar line cards. For example, if a device has slots for 22 line cards, but there are only two installed line cards, then the power requirements for this device configuration is approximately 10% of the fully populated device. Because all line cards do not have the same power requirements, however, this 10% value represents a typical value. There is thus a need to have a protection circuit and system that works in conjunction with such telecommunications devices and capable of meeting the protection requirements for such telecommunications devices no matter the number of any installed line cards.

It should also be understood that a telecommunications device, such as a DSLAM, typically has one or more access modules, for example, line cards. Each of the access modules has multiple xDSL chip sets, which use a large portion of their power that is supplied to the telecommunications device. Because of the rising cost of energy, the size and cost of a device's power supply and the size and cost of its cooling system are approximately proportional to the amount of power used by a chip set. It is desirable, therefore, to reduce the power used by the chip sets. This is even more understandable with the current societal trends to be more energy conscious. In general, service providers furnish a customer with a data rate equal to or greater than the data rate in a Service Level Agreement (SLA), and thus, there is room for improvement and energy savings.

SUMMARY OF THE INVENTION

A communications system includes a communications device having a plurality of access modules, each having a port and connected to a communications line. A plurality of transmitters are included with a respective transmitter associated in one-to-one correspondence with the communications line of an access module. Each transmitter has a line driver and is configured to couple communications signals to a respective communications line. A voltage source is connected to the line drivers and configured to provide a bias voltage to the line drivers that varies depending on a selected minimum power level. A controller is connected to the voltage source and has logic configured to change the bias voltage to the line drivers. The controller is responsive to a minimum data rate for each bias voltage.

The voltage source in one example includes a first bias voltage source configured to provide a first bias voltage. A second bias voltage source is configured to provide a second bias voltage. The line driver has a first mode based on the first bias voltage and a second mode based on the second bias voltage. In one example, the controller directs bias voltages to the line driver and is responsive to a minimum data rate for each bias voltage.

In another example, the telecommunications device comprises a Digital Subscriber Line Access Module (DSLAM). Each access module is formed as a line card having "n" line cards with each line card having a plurality of communication ports. In an example, the controller is configured to compare a required data rate and reset any bias voltages.

In another example, the controller is configured to determine a required data rate in each respective communications line based on telecommunications service requirements as a data rate established by a service level agreement. The controller is configured to determine a lowest power decibel margin for a respective transmitter and calculate a minimum power required to provide a desired telecommunications service requirement from a respective transmitter. This controller is configured to adjust power at an access module if a data rate for a telecommunications service requirement has changed.

In yet another aspect, a method is provided for reducing power requirements in the telecommunications device.

BRIEF DESCRIPTION OF THE DRAWINGS

Other objects, features and advantages of the present invention will become apparent from the detailed description of the invention which follows, when considered in light of the accompanying drawings in which:

FIGS. 4A through 4F are schematic circuit diagrams showing an example of the smart breaker in accordance with a non-limiting example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As indicated above, a telecommunications device, such as a ISLAM, often is not fully populated with line cards, which are also referred to as access modules as a generic term and often used interchangeably. Line cards are added to meet the needs of customers and service providers in order to protect telecommunications devices from electrical faults, for example, shorts or certain line card failures. These devices incorporate circuit breakers to separate the power source from the line cards. If a telecommunications device is fully populated with line cards, the circuit breaker is typically configured to allow enough current to flow in order to meet the power requirements of all the installed line cards. For example, if a telecommunications device is fully populated and the current requirements to meet all the power needs is 22 amperes, then a circuit breaker rated at 30 amperes may be selected to provide adequate fault protection. However, if the telecommunications device is only partially populated with line cards, for example, containing only 10% of the possible line cards that can be inserted into the device, the current requirements may be around 4 amperes. As a result, when there are fewer line cards in a device, the circuit breaker of 30 amperes may not provide adequate fault protection. This excess capacity at 30 amperes of the circuit breaker in a 10% populated telecommunications device could allow hazardous and destructive fault currents to flow, thus, damaging one or more line cards or other components in the device.

Figure 1:
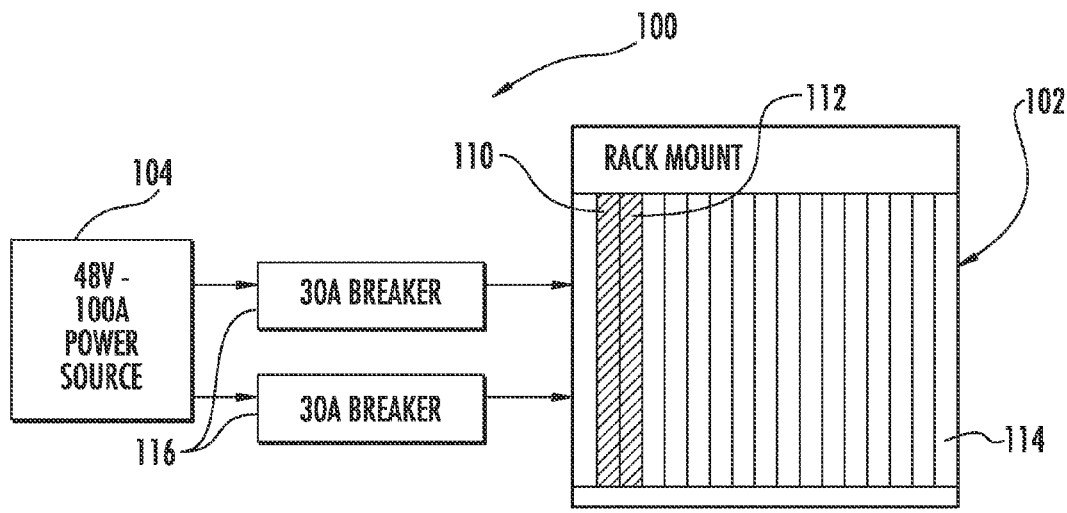
FIG. 1 is a block diagram of a prior art telecommunications system that illustrates a device, such as a DSLAM, and showing use of a conventional circuit breaker for protection.

FIG. 1 shows a prior art telecommunications system 100 that includes a rack mount telecommunications device 102 as a DSLAM in this one non-limiting example and connected to a power supply 104, which in this example is a 48 volt 100 ampere power source. The two shaded areas in the telecommunications device as the DSLAM 102 indicate that two line cards are installed, for example, a modem 110 and a system module 112. In this example, the number of slots 114 available for line cards is 20, and thus, only 10% of the available slots have line cards. Two conventional 30 A breakers 116 are connected to the power source 104. In general, to provide redundancy, two independent voltage sources are in the power source and each independent source is connected to the telecommunication device using a respective 30 A breaker 116. The breakers 116 have a trip point of around 30 amperes in this prior art example. A breaker 116 will transition to an open state, i.e., becomes an open circuit, if the current through the breaker exceeds the trip point value for a period of time (which is manufacturer and device design dependent). If the total current requirements of the two installed line cards is, for example, 4 amperes then the amount of current greater than the required current would be 26 amperes (30 amperes minus amperes). In this described example, there are 26 amperes available to do damage to the telecommunications device before it is disconnected from the power source should a fault occur.

Figure 2:
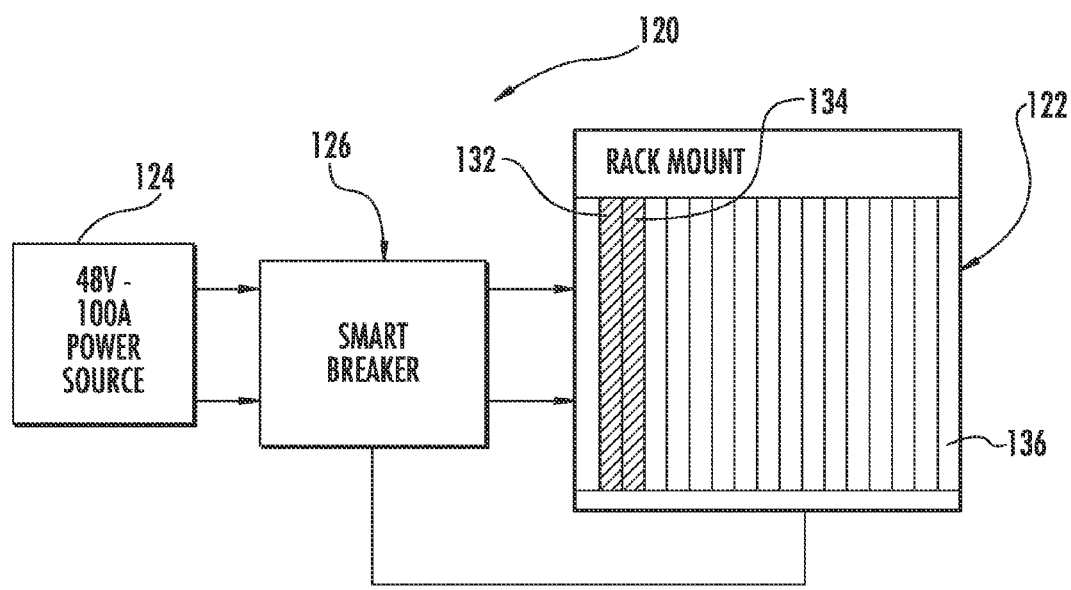
FIG. 2 is a block diagram showing a telecommunications system and device having a smart breaker for protection in accordance with a non-limiting example.

FIG. 2 shows a telecommunications system 120 that includes a telecommunications device 122 connected to a power supply 124 by a smart breaker 126 in accordance with a non-limiting example. The power source 124 and telecommunications device 122 as a DSLAM are similar as described in FIG. 1 and illustrates two cards mounted in the DSLAM as a modem 132 and system module 134 and showing the remaining empty slots 136. The smart breaker 126 has functionality that is adaptable, such as changing the trip point, for protecting the telecommunications device 122 as the number of line cards in the device is changed. The telecommunications device 122 is configured such that its system module 134 stores configuration information. Included in this configuration information is, for example, the number of installed line cards, the amount of power used by each of the line cards, the expected peak power requirements, the data rate, and other information. The data rate is advantageous with the protection of telecommunications devices but may not be necessary for other devices to be protected. The system module 134 informs the smart breaker 28 of the power needs of the device to be protected and its installed line cards (as with a telecommunications device) and the smart breaker 126 adjusts the trip point to provide appropriate protection. The trip point is set, for example, to a value somewhat greater, for example, 20% to 50% than the current required to meet the power needs. For example, if the telecommunications device 122 required 4 amperes, the trip point of the smart breaker 100, may be set at 6 amperes. If there were a fault in one of the line cards or elsewhere on the telecommunications device, power would be disconnected before there was significant damage.

Figure 3:
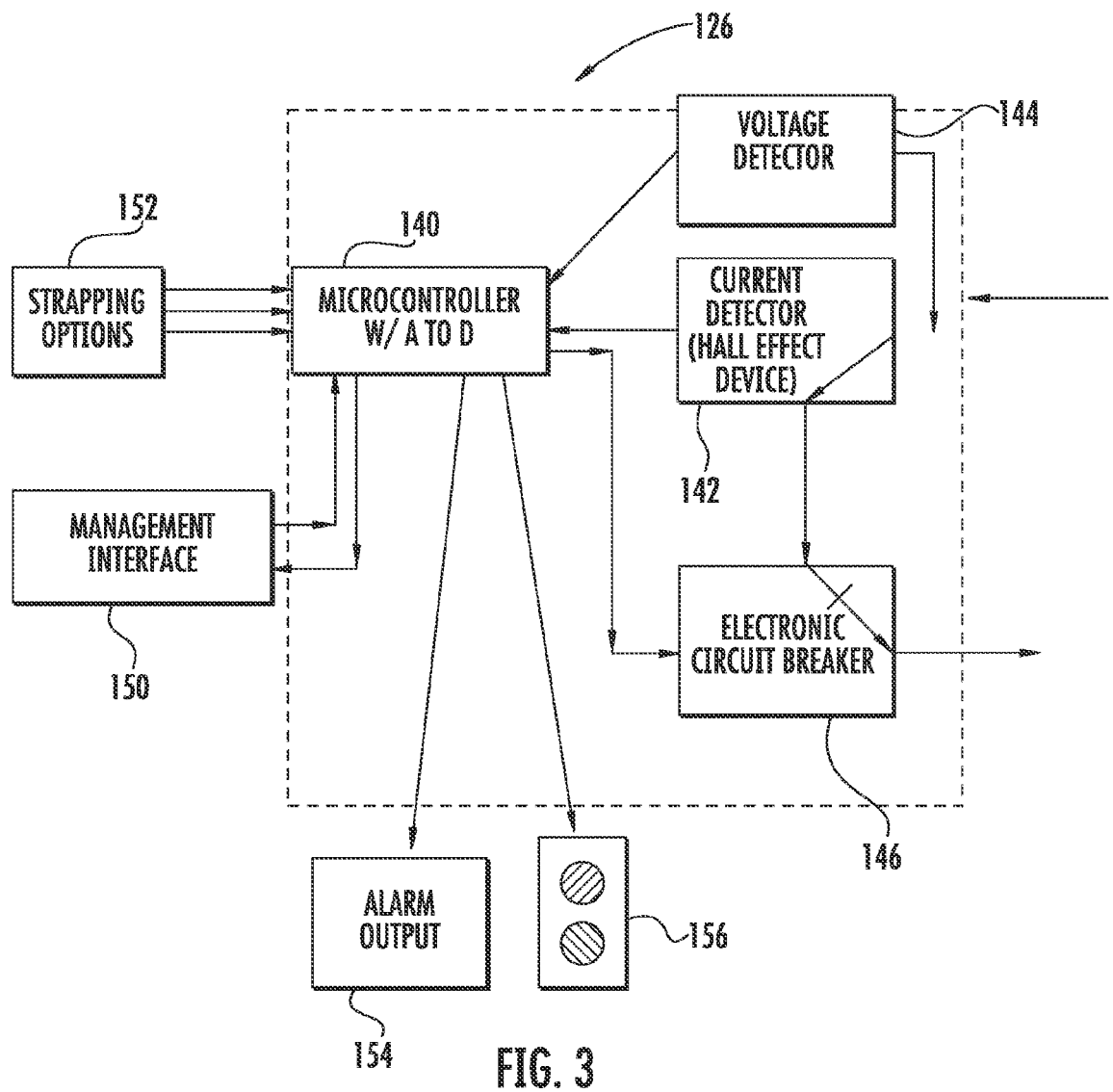
FIG. 3 is a more detailed view as a block diagram of the smart breaker in accordance with a non-limiting example.

A block diagram of the smart breaker 126, in accordance with a non-limiting example, is shown in FIG. 3. The smart breaker includes a controller 140, typically formed as a microcontroller or other processor circuit and including an analog-to-digital (A/D) circuit function and/or logic, and coupled to a current detector 142, such as a Hall Effect device, a voltage detector 144, and a circuit breaker element 146 such as an electronic circuit breaking element, MOSFET switch, or mechanical relay. It should be understood that a MOSFET switch is preferred for a DC power circuit breaker function, while a mechanical relay can be used for an AC type breaker function. The relay as a circuit breaker has a closed state for allowing current to pass and an open state for blocking current flow. The microcontroller 140 is also in communication with the system module 134 of the telecommunications device such as described relative to FIG. 2. The microcontroller has logic that determines a desired state, open or closed, for the electronic circuit breaker. For example, if the current detected by the current detector 142 exceeds a threshold current value stored in a memory of the microcontroller, a control signal is generated and causes the breaker to go to an open state in order to block current flow. A command through management interface 150 could also be used transfer the breaker between the two states.

Strapping options 152 are also shown and connected to the microcontroller 140. These strapping options could include settable integration straps as an example. These strapping options could include DIP switches that are set for integrating fast transients and maximum current. These switches or other circuits or modules as part of the strapping options could be used to set different ampere smart breaker settings and configured for a serial port in conjunction with a management channel as part of the management interface 150 to a specific shelf or rack mounted system. The management interface 150 in conjunction with the strapping options 152 can be used for provisioning and programming the microcontroller 140 in one example. The smart breaker 126 can be configured for specific applications. The strapping options 152 allow a hard strap to be configurable from a serial port. Depending on applications and design, it can be configurable from Ethernet connection.

An alarm output 154 is also illustrated that could include a visual indicator 156 that operates in conjunction therewith to indicate that the breaker 146 has transitioned to an open or closed state. Thus, there can not only be an audible alarm through the alarm output 154 to indicate an open or closed state, but also a visual indication through the display 156.

Figure 4A:
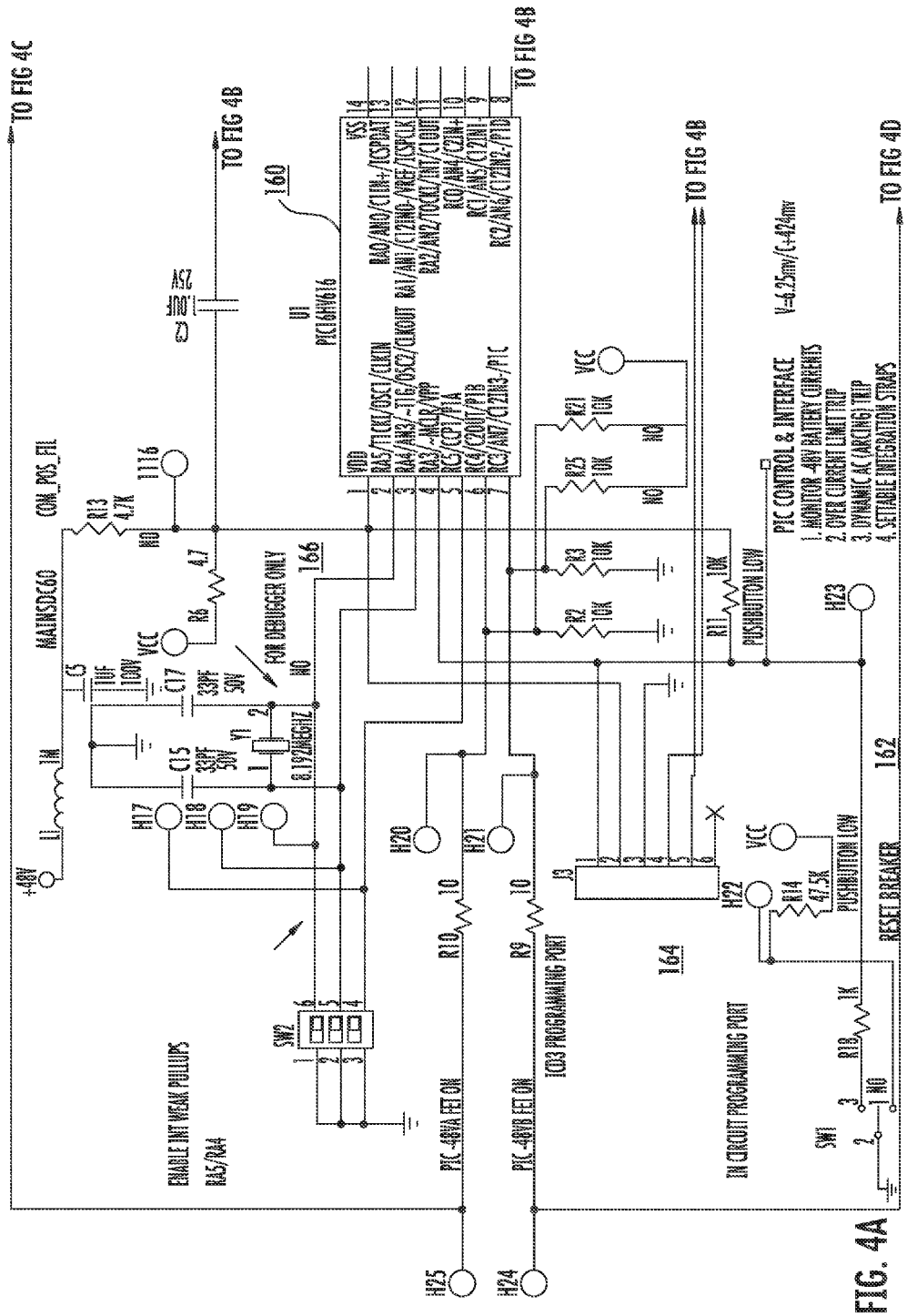

FIGS. 4A through 4F are schematic circuit diagrams of example embodiment of the smart breaker 126 circuit that can be used in accordance with a non-limiting example. FIG. 4A shows a processor segment of the smart breaker circuit and showing a controller 160 that in one example is a PIC control and interface circuit such as using a PIC 16HVG16 processor and showing various inputs including switches. In this particular circuit example, there is a reset breaker segment 162 and programming port 164. The system monitors 48 volt battery currents and includes settable integration straps such as described before. A debugger circuit 166 is illustrated.

Figure 4B:
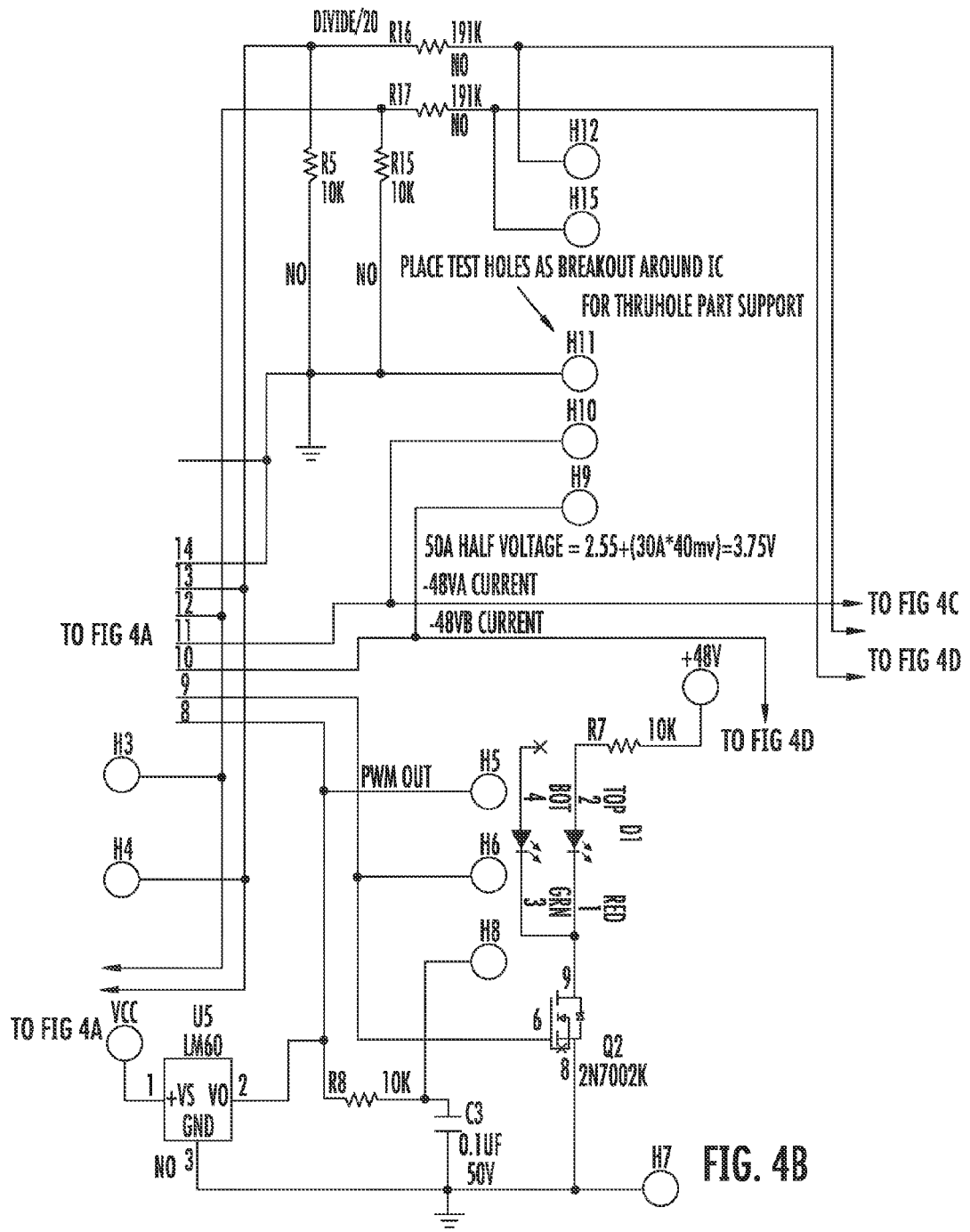
Figure 4C:
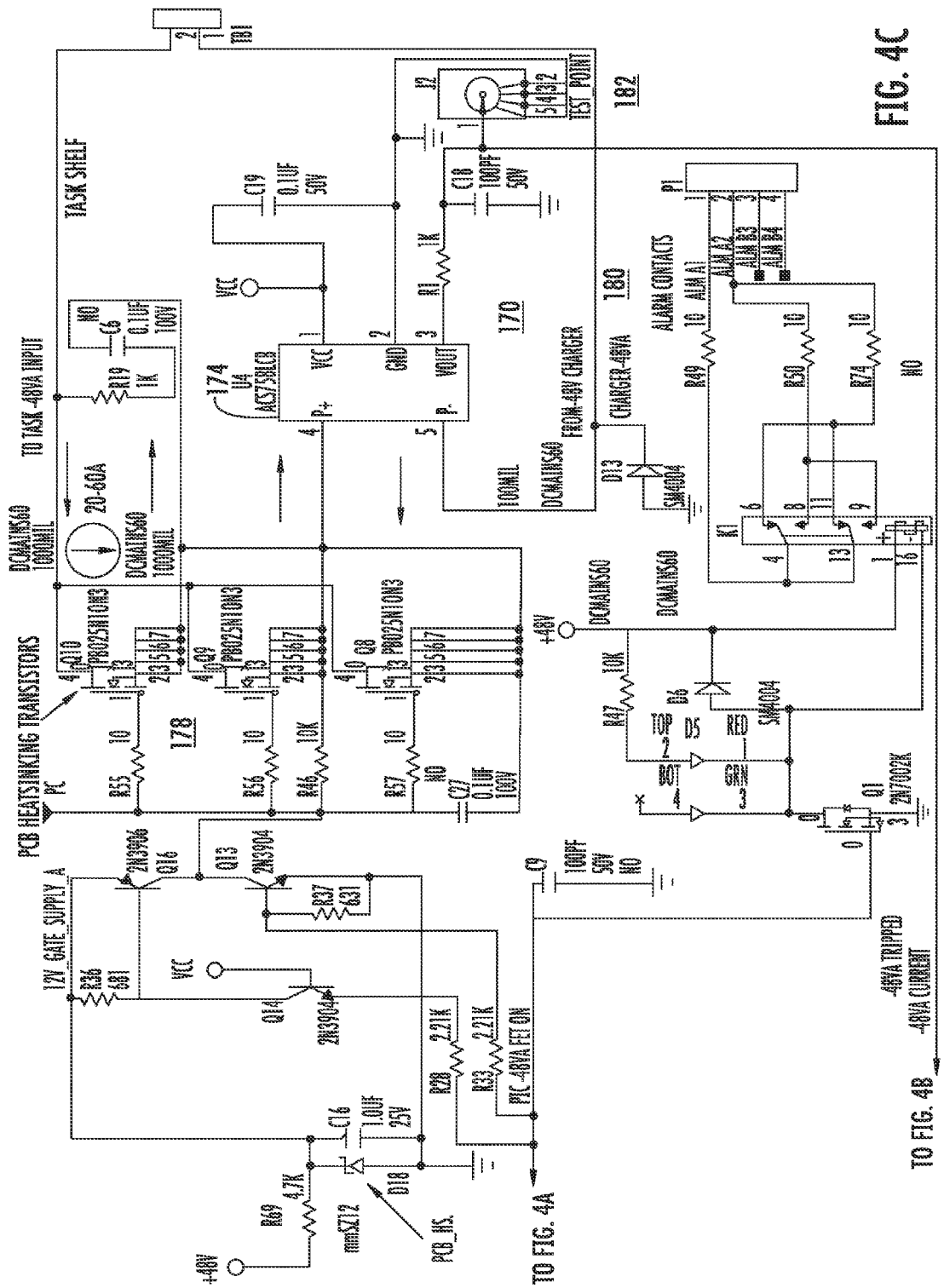

FIG. 4B shows a circuit segment as a transition between the processor segment shown in FIG. 4A and two different current sensor circuits 170, 172 shown in FIGS. 4C and 4D and showing the Hall Effect sensors 174, 176 that are each connected to transistors 178 as Field Effect Transistors and forming an array through which current enters and forms a control loop with the microcontroller 160 through the transition circuit shown in FIG. 4B. Each Hall Effect sensor in a non-limiting example is a Hall Effect sensor integrated circuit such as manufactured by Allegro Microsystems, Inc. as Part No. ACS758LCB and acts as a current sensor and provides fast switch time with accuracy at 100 kHz.

Figure 4E:
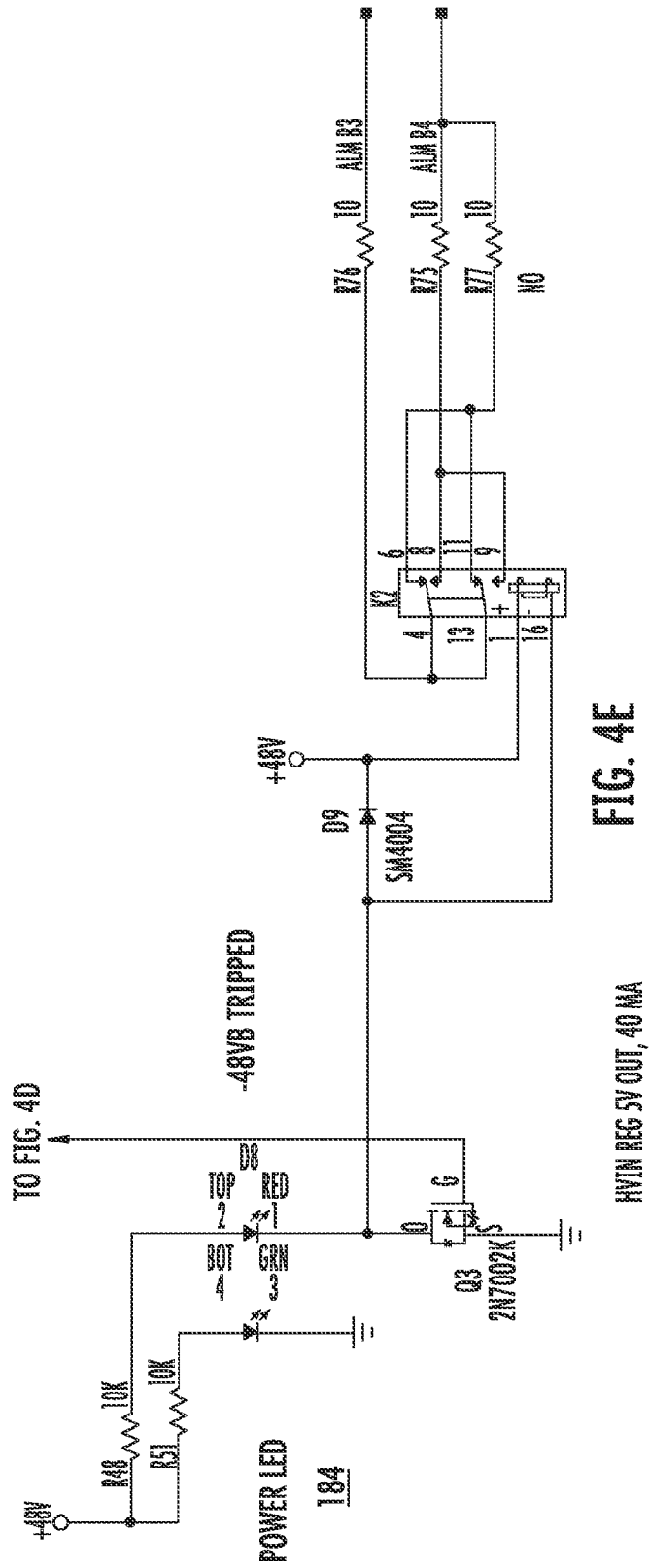
Figure 4F:
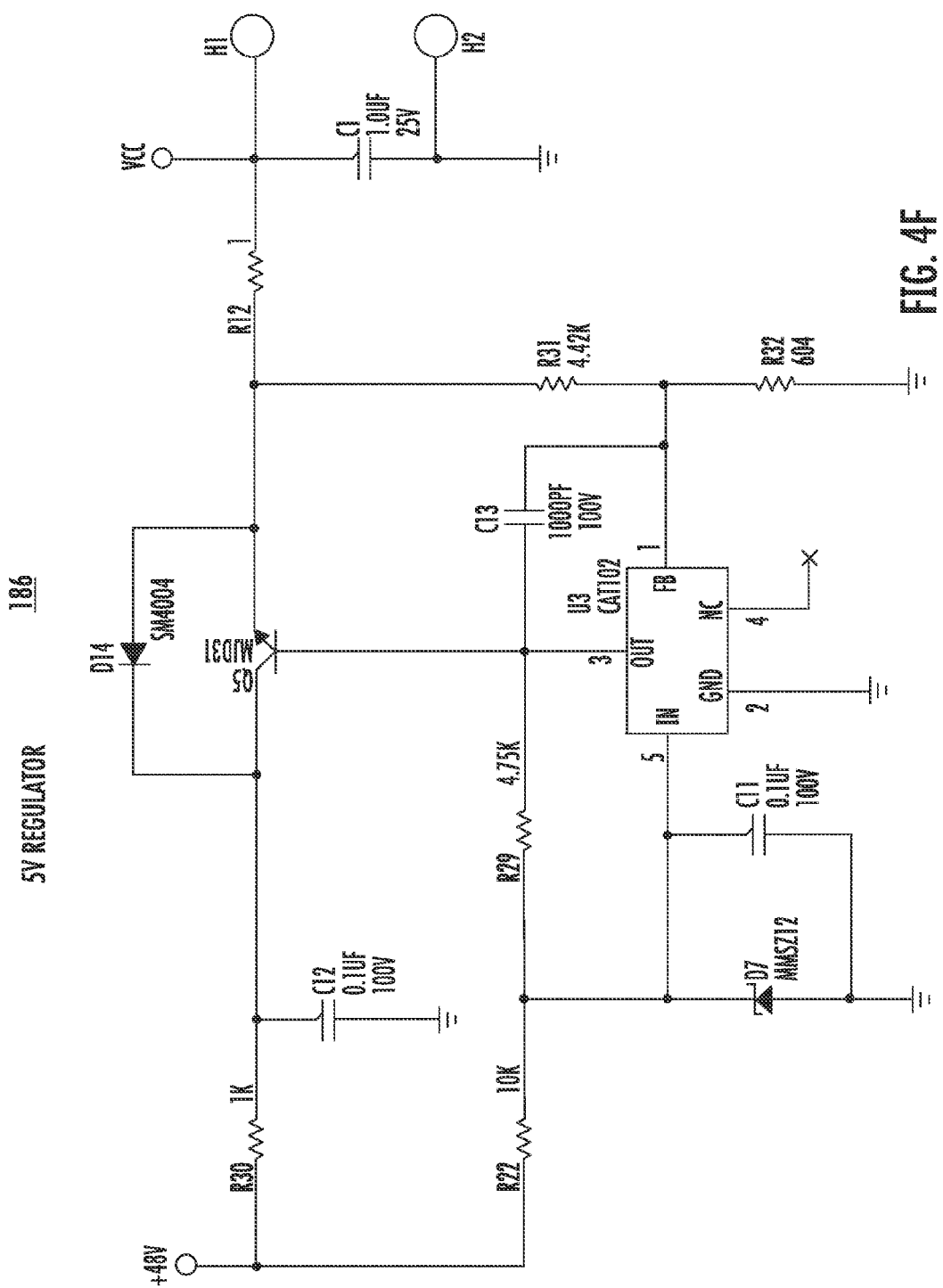

The current sensor circuit 170 shown in FIG. 4C also shows an alarm contacts circuit 180 and a test point circuit 182. FIG. 4E shows a power LED circuit 184 and FIG. 4F shows a five-volt regulator circuit 186 that interoperates with the circuits as described and shown in FIGS. 4A through 4E.

Figure 5:
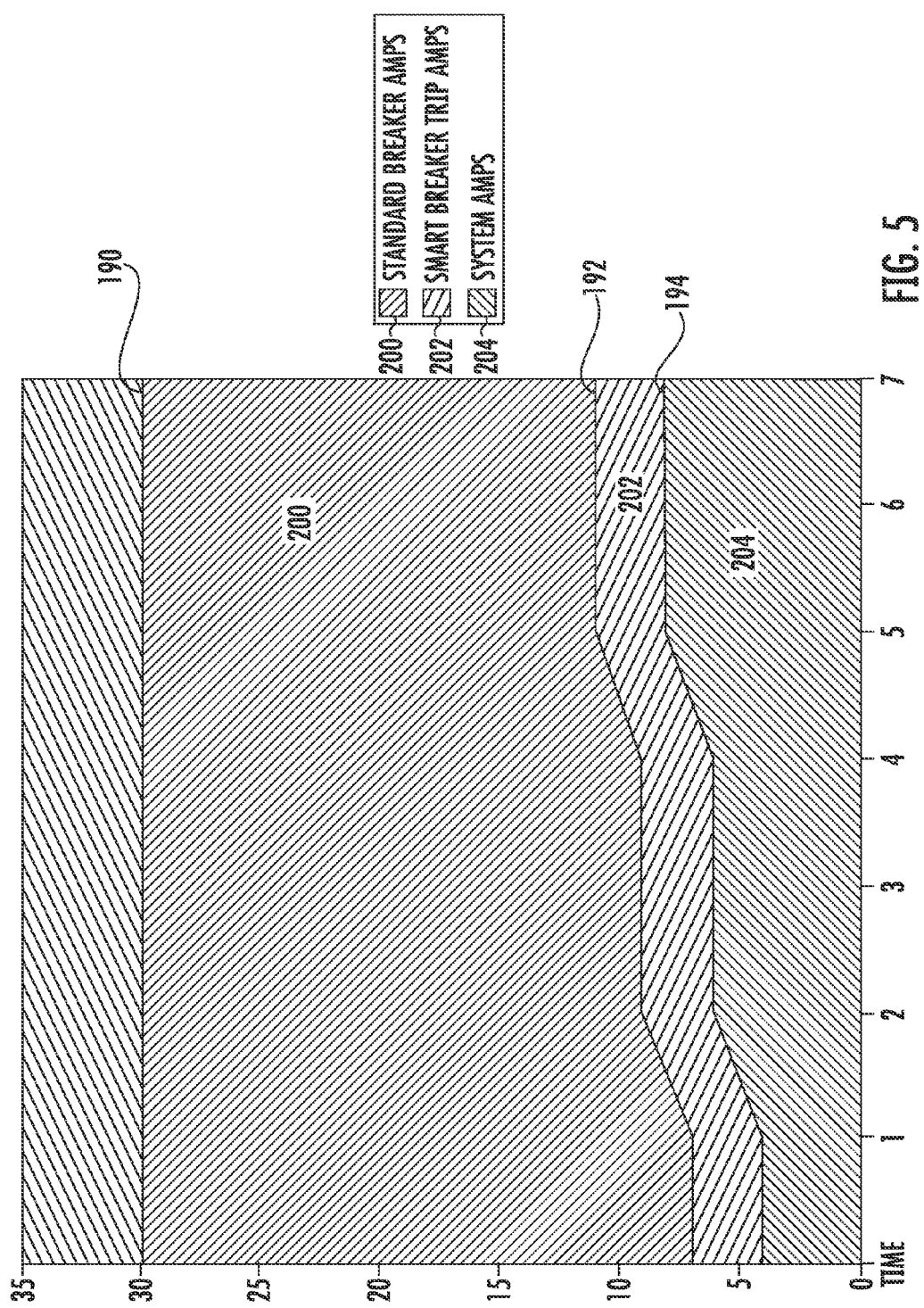
FIG. 5 is a graph depicting adaptive characteristics of the smart breaker in accordance with a non-limiting example.

FIG. 5 is a graph showing the various adaptive characteristics of the smart breaker in accordance with a non-limiting example. This graph shows the conventional breaker line 190, the smart breaker set value 192 and the unit current requirements 194. The standard breaker amperage is shown by the area 200 under the straight line at 190 and the smart breaker trip amperage value is illustrated as the shaded area at 202 and the system amperage is shown at the shaded area at 204.

Figure 6:
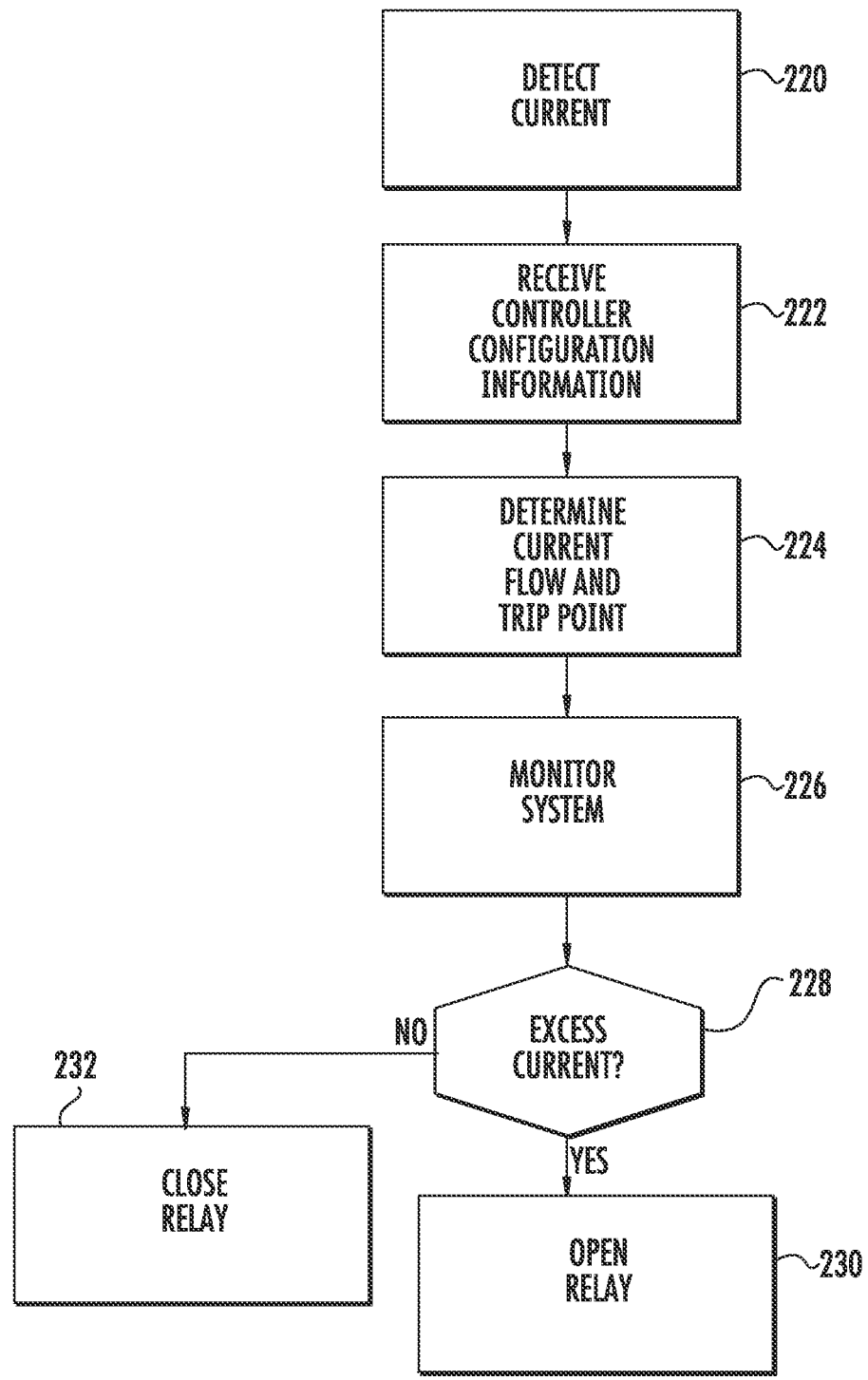
FIG. 6 is a high-level flowchart illustrating a sequence of method steps that can be used for operating the smart breaker in accordance with a non-limiting example.

FIG. 6 is a high-level flowchart illustrating an example of a method sequence that can be used in accordance with a non-limiting example. Current is detected in a current detector that is connected to a protected device such as a telecommunications device, e.g., DSLAM (block 220). Controller configuration information is received regarding the power requirements of the protected device, such as from a system module installed in the protected device (block 222). The trip point is determined within the controller in response to current flow and the received configured information (block 224). The controller monitors the system (block 226) and a decision is made regarding excess current (block 228). If the current is in excess, the relay is opened to block current from passing to the protected device (block 230) and if not in excess, the relay is closed to allow current to pass to the protected device (block 232).

Figure 7:
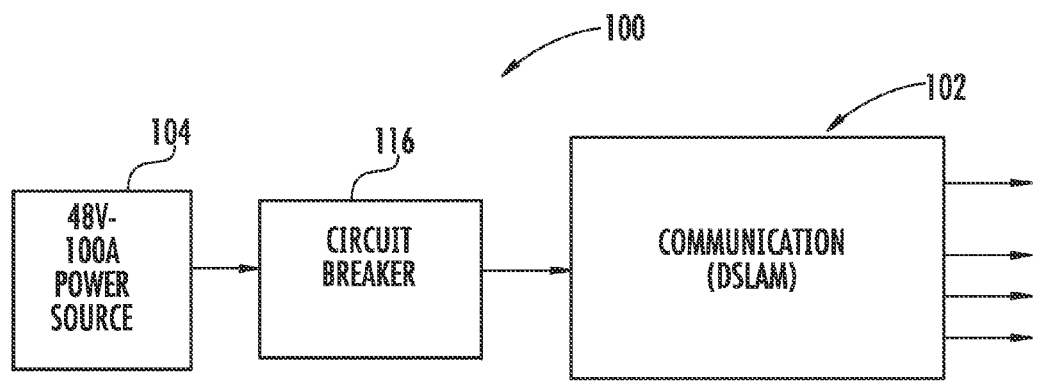
FIG. 7 is a block diagram showing another prior art telecommunications system that includes a device as a DSLAM and showing conventional circuit breaker protection.

FIG. 7 is another view of a prior art telecommunications system similar to that view shown in FIG. 1 and showing the telecommunication system 100 such as including the device as a DSLAM 102 connected to the power source 104 via the conventional circuit breaker 116. The line cards in this example are not illustrated. In this prior art example, the set point of the conventional circuit breaker is a fixed value such that the circuit breaker may not provide adequate protection to the telecommunications device 102 when that device is not fully populated with the line cards. For example, if the telecommunications device 102 requires only 5 Amperes to power the device as configured, and the circuit breaker is a 30 Ampere breaker, then an excess current of 25 Amperes can flow before the circuit breaker trips. If the device is fully populated and requires 22 Amperes, the 30 Ampere breaker provides adequate protection.

Figure 8:
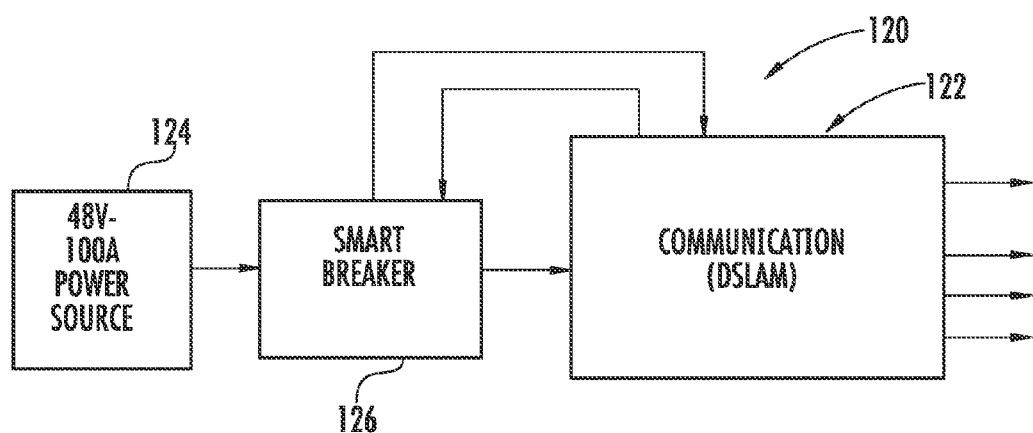
FIG. 8 is a block diagram showing another view of the telecommunications system that includes the smart breaker in accordance with a non-limiting example.

FIG. 8 is another example of the telecommunication system 120 in accordance with a non-limiting example and showing the communications device 122 connected to a power source 124 and the smart breaker 126. As in FIG. 7, the line cards are not illustrated. The smart breaker 126 monitors current flow and supply voltage from the power supply. The information, current flow and voltage are communicated to the microcontroller as part of the smart breaker for power status.

As noted before, the controller such as described before relative to FIG. 3 takes the provisioning information related to the communications device that is provided to the smart breaker, for example, from the system module as a line card. In this particular example, the provisioning information includes the number of installed line cards, the power requirements of each of the line cards, the peak power requirements of each of the line cards, and in this particular example, the data rates and other information typically stored in a telecommunications device such as the DSLAM. The current flow and voltage read by the smart breaker 126, together with the provisioning information sent to the smart breaker, are used to determine a set point value for the smart breaker. The use of the data rate is particularly beneficial since a telecommunications device is illustrated in the preferred embodiment. Other devices to be protected will not require use of data rate. The set point value for the smart breaker is adjusted by the controller of the smart breaker in response to inputs from the DSLAM or other telecommunications device, components and equipment that contain information relating to equipment to be protected. Because this protection system using the smart breaker adapts to the needs of the telecommunications device, the chances of damage to the device are reduced.

Figure 9:
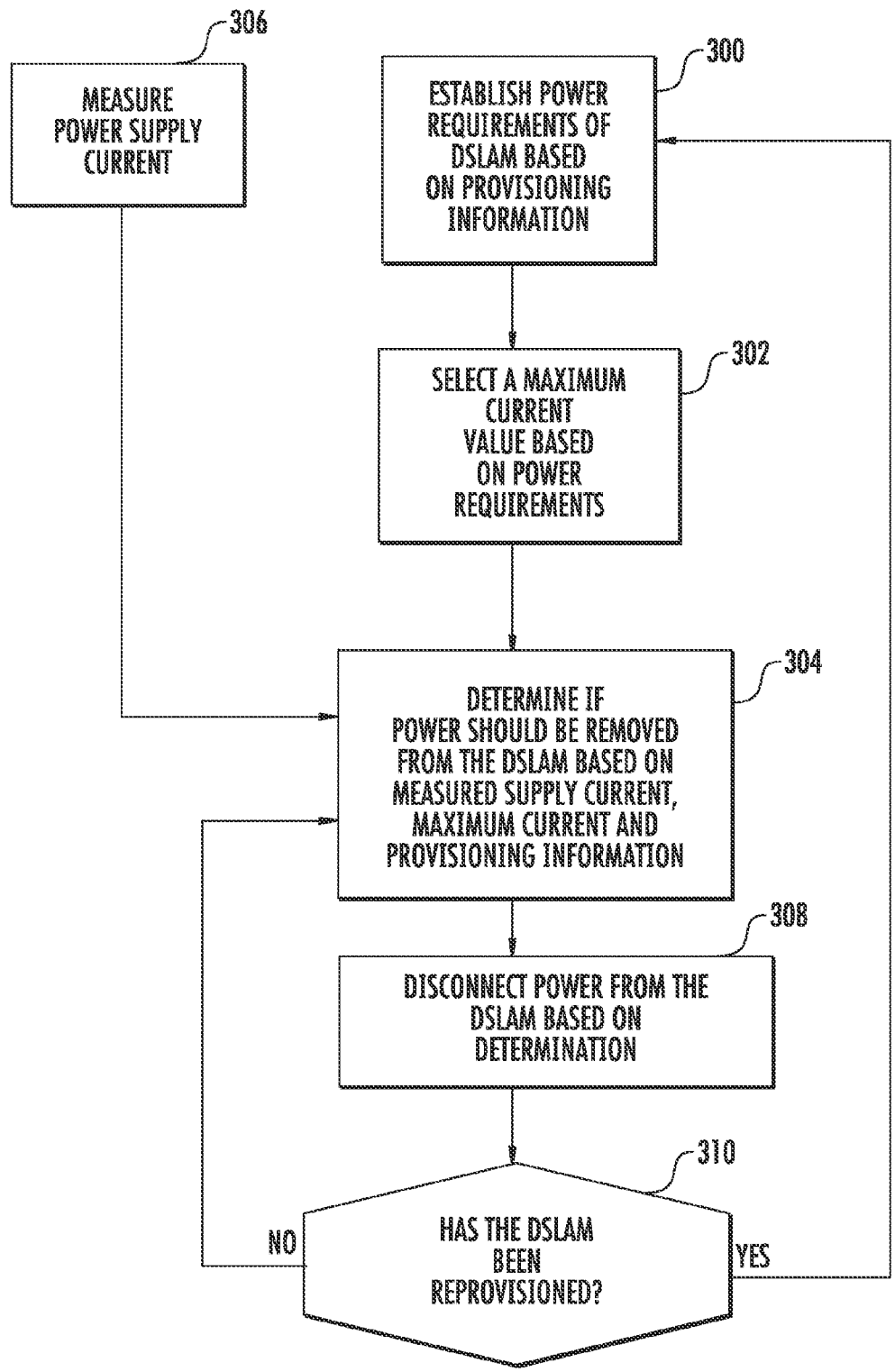
FIG. 9 is a high-level flowchart illustrating a basic sequence of method steps for protecting the telecommunications device using the smart breaker in accordance with a non-limiting example.

FIG. 9 is a high-level flowchart illustrating a sequence of steps for carrying out a method in accordance with a non-limiting example. As shown at block 300, power requirements of the DSLAM are established based on provisioning information. A maximum current value is selected based on the power requirements (block 302) and a determination is made if power should be removed from the DSLAM based on the measured supply current, maximum current and provisioning information (block 304). One of the inputs is the measured power supply current (block 306). Power is disconnected from the DSLAM based on this determination (block 308). A determination is further made if the DSLAM has been reprovisioned (block 310). If so, then the process begins again (block 300), and if not, then a determination is made if power should be removed from the DSLAM based on the measured supply current and maximum current and provisioning information (block 304).

The description above has proceeded with a description of a smart breaker and related system for protecting a DSLAM or other protected device and using the current detector and controller having logic and configured to select a trip value in response to detected current flow and stored configuration information relating to a protected device such as the DSLAM. There now follows a description relative to FIGS. 10-12 regarding a power saving line driver system such as a line driver of a telecommunications system that may include DSLAM functionality.

Figure 10:
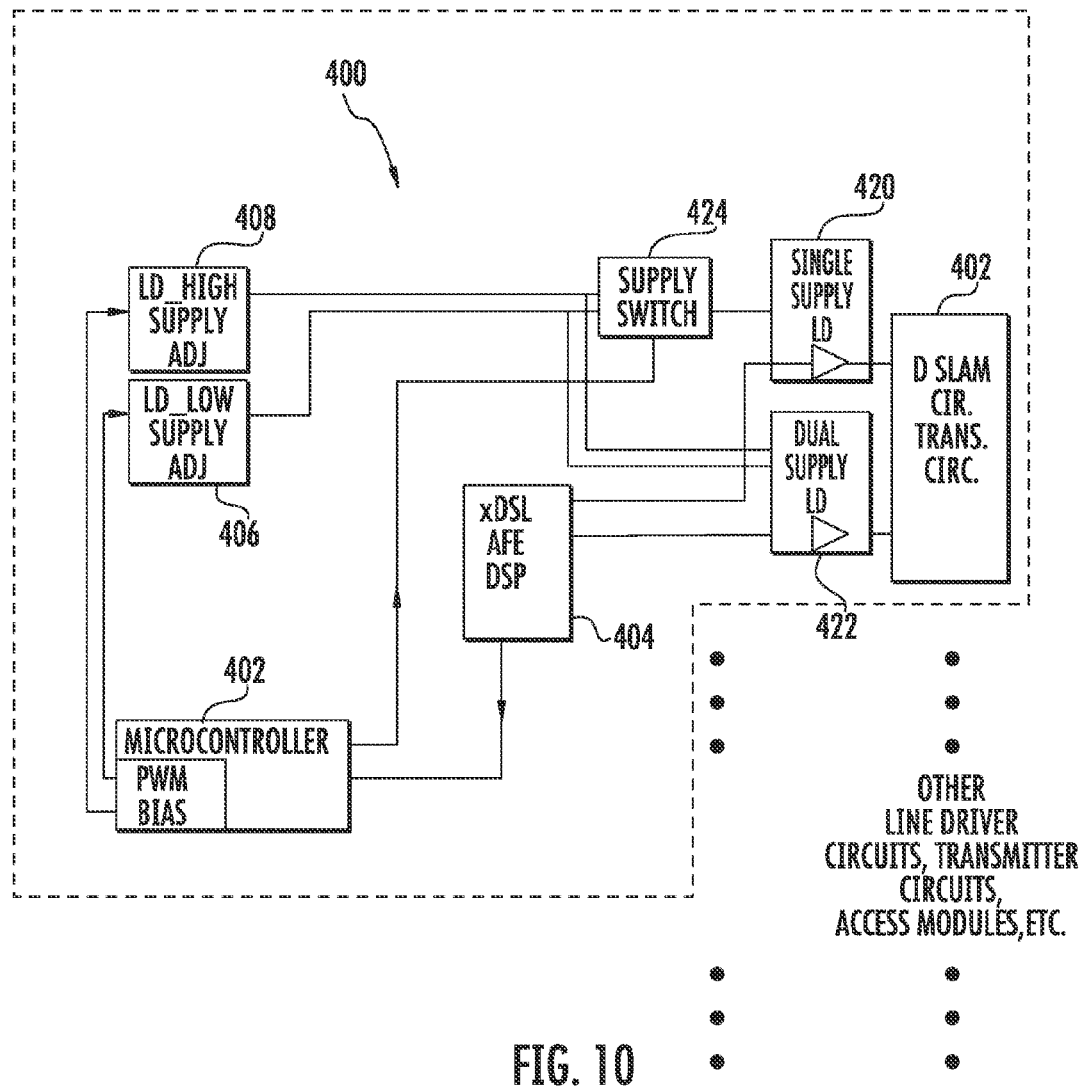
FIG. 10 is a high-level block circuit diagram showing basic components for a telecommunications line driver system for protecting a telecommunications device from power faults in accordance with a non-limiting example.

FIG. 10 shows a power saving line driver system 400, for example, a line driver of a telecommunication system that may include DSLAM functionality and multiple access modules or line cards that populate a telecommunications device as described before. The system 400 includes DSLAM circuitry 401 in this example, including transmitter circuitry. A microcontroller 402 monitors the module status. It is possible at least part of this circuit as described is part of a smart breaker in one non-limiting example. In this example, the microcontroller 402 receives and stores provisioning information and other information concerning the line cards or access modules. In the example shown in FIG. 10, the microcontroller 402 includes a circuit or module for Pulse Width Modulated (PWM) signals and bias signals and connects to a Digital Signal Processing (DSP) chip 404 that includes an external Analog Front End (AFE) circuit. It should be understood that line drivers of the DSLAM couple communication signals, such as xDSL signals to a communication line. The line drivers are capable of operating over a range of bias voltages.

The power saving line driver system 400 shown in FIG. 1 receives power from a power supply that has a low-voltage source 406 and a high-voltage source 408 and can be adjustable in one non-limiting aspect, and act as bias voltages, for example, first and second bias voltage. The microcontroller 402 is coupled to each of the voltage sources. This microcontroller 402 has the ability to adjust the output voltage of each source by sending control signals to the sources. For example, the low-voltage source 406 may have a voltage range adjustable between 8 and 12 volts. A control signal from the microcontroller has the ability to set the voltage to a desired voltage in the voltage range. The line driver system as illustrated includes a first circuit as a single supply line driver voltage port 420 and the second circuit as a two supply voltage port 422 and operating with a supply switch 424. This allows switching from sources 406, 408 into respective single or dual supply 420, 422. The output power for either version of the line drivers is maximum, Pmax, when a maximum voltage, such as 24 volts, is applied to the supply voltage port. However, when a communications signal is transmitted at Pmax, the transmitted data rate may exceed a desired data rate, such as the data rate of a Service Level Agreement (SLA).

In accordance with a non-limiting example, information within a service module (such as described before) of the telecommunications device as a DSLAM implements a reduced power mode. If the service module information indicates that power can be reduced from Pmax to PSLA (power level to meet SLA), then power from the power source is reduced accordingly. For example, if the single supply line driver 420 sends a first data rate when 24 volts is applied and the first data rate exceeds the data rate of the SLA, then the voltage to the line driver is reduced accordingly. Logic within a service module of the DSLAM determines the power level, PSLA, that is required to meet or exceed the data rate of the SLA. If the voltage required to transmit the SLA data rate is 16 volts, then the power supply output changes from 24 volts to 16 volts. When such a change in voltage occurs, the power to each DSL chip on the access module has a single supply port and is reduced. To ensure that other customer service has not been compromised by a reduction in data rate, the data rate to each customer is reviewed. If any customer receives a data rate below a contracted value, the voltage from the power supply must be readjusted until each customer has a desired data rate and is satisfied.

Figure 11:
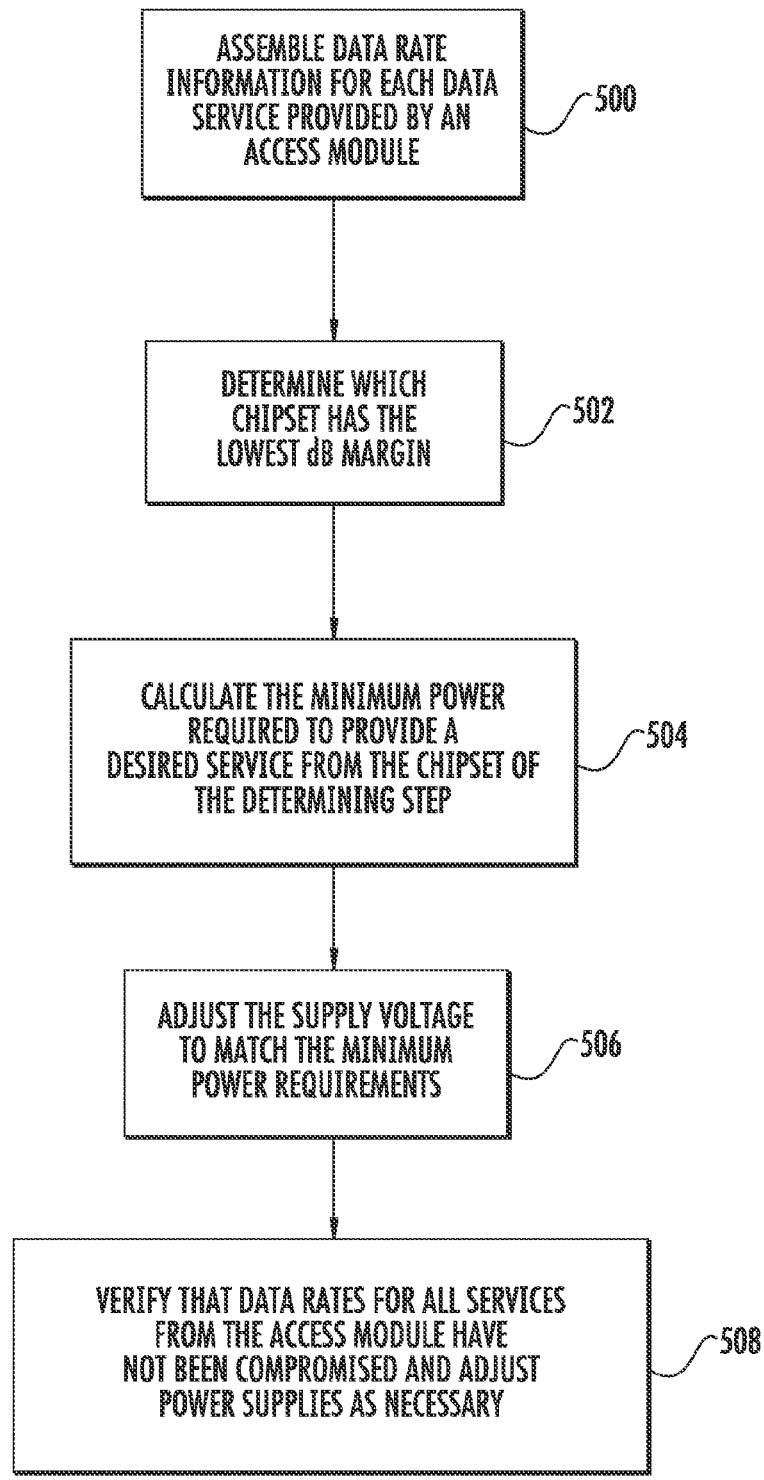
FIG. 11 is a high-level flowchart illustrating a sequence of method steps for protecting the telecommunications device from power faults in accordance with a non-limiting example.

FIG. 11 is a flowchart illustrating a sequence of steps for operation of the line driver system as described in accordance with a non-limiting example. The data rate information is assembled for each data service provided by an access module as a line card in a non-limiting example (block 500). A determination is made which chip set has the lowest decibel margin (block 502). The minimum power required to provide a desired service from the chip set is calculated (block 504). The supply voltage is adjusted to match the minimum power requirements (block 506). As a subsequent step, the system verifies that data rates for all services from the access module have not been compromised and adjusts the power supply as necessary (block 508).

Figure 12:
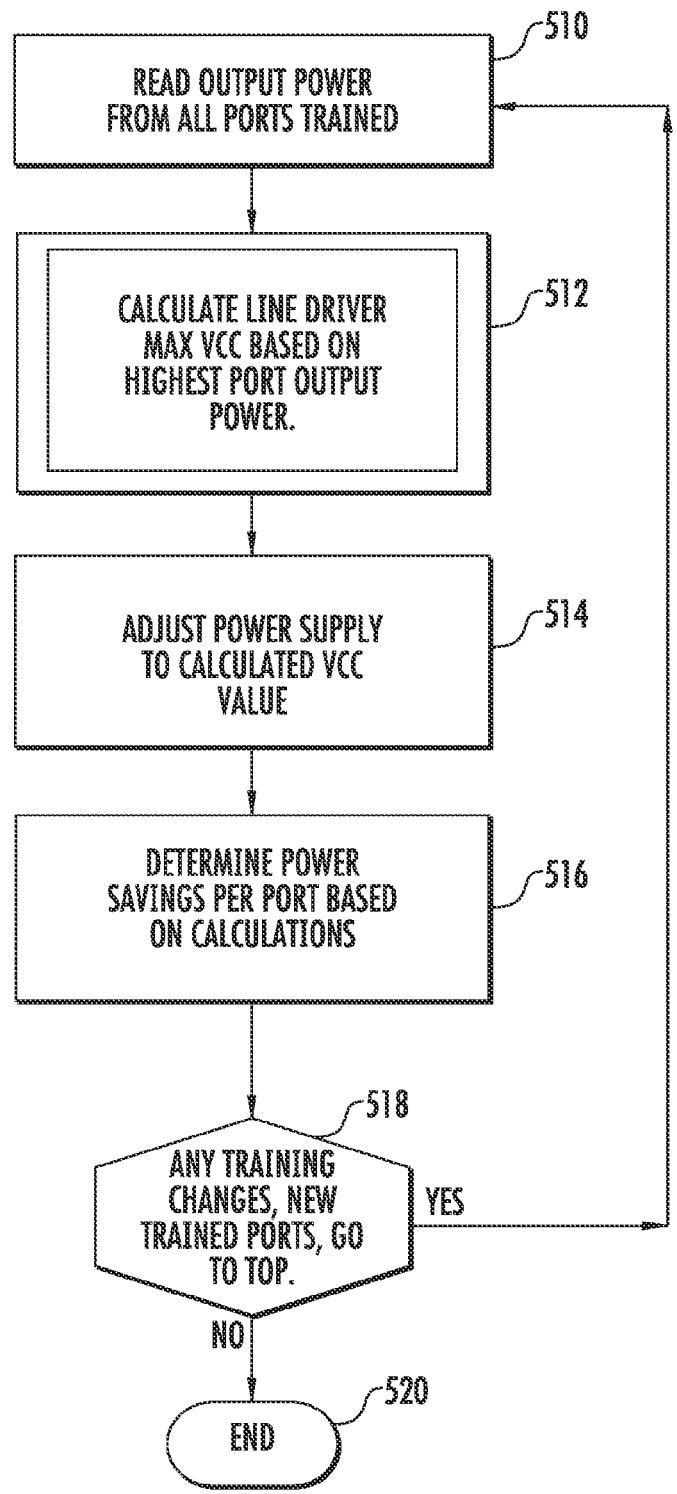
FIG. 12 is another high-level flowchart illustrating a sequence of method steps for protecting a telecommunications device from power faults in accordance with a non-limiting example.

FIG. 12 is another flowchart showing a sequence of operation for the line driver system as described. As shown at block 510, the output power is read from all ports that are trained. As shown at block 512, the line driver Max Vcc is calculated based on the highest port output power. The power supply is adjusted to the calculated Vcc value (block 514). The system then determines the power savings per port based on the calculation (block 516). A determination is made if there are any training changes and new trained ports (block 518), and if yes, the process loops and continues to read the output power from all trained ports (block 510). If not, the system ends at block 520.

It should be understood that the system as described uses the processor or microcontroller to determine when to make a voltage change on multiple ports to reduce power at virtually little cost. In one example, it is based on reported output parameters from the AFE/DSP circuit 404 such as shown in FIG. 10 and using processor calculation rather than circuit processing on an individual channel basis. It is a system approach rather than a per port type approach and is not circuit based for adjusting the bias voltage. Some prior art techniques use bias to a line driver and adjust based on the peak value of a signal. This system, in accordance with a non-limiting example, sets bias based on the minimum data rate required to meet a Service Level Agreement.

An example of the operation of the Line Driver Power Savings System, in accordance with a non-limiting example, is described below. This algorithm determines how much power savings can be gained on a multiport line card based on an output dbm level.

1. Read trained output dBm level from each active port. An example output from a trained port report is set forth below. This information is read from the VDSL2 DSP.

| VDSL-AM#sho int vdsl 1/3/1 | |
|---|---|
| VDSL 1/3/1 | |
| Service State | In Service |
| Line Status | Up |
| Rate Mode | Adapt at start up |

-continued

| VDSL-AM#sho int vdsl 1/3/1 | |
|---|---|
| DMT Standard | 993.2A (VDSL2 Region A) |
| Band Profile | 8A |
| CPE Vendor | 23456789 (ver 0123456789012345) |
| Framing | EFM |
| Est Length | 236 ft-26 ga |
| Up Time | 13880 sec |

| | Downstream | Upstream |
|---|---|---|
| Line Rate | 90743 kbps | 7924 kbps |
| Payload Rate | 80148 kbps | 6772 kbps |
| Margin | 6.7 dB | 7.1 dB |
| Power | 14.5 dBm | −3.3 dBm |
| Attenuation | 0.4 dB | 0.4 dB |
| Max Attain Rate | 82116 kbps | 7011 kbps |
| Actual Delay | 6.0 ms | 8.0 ms |
| Actual INP | 1.6 sym | 2.4 sym |

This port is transmitting at +14.7 dBm.

2. Create a table of port and power outputs for all trained in service ports. A table of a card might look like this:

| Port 1 | 14.5 dBm |
|---|---|
| Port 3 | 7.7 dBm |
| Port 4 | 3.3 dBm |
| Port 9 | 11.7 dBm |
| Port 10 | 9.7 dBm |
| Port 14 | 6.7 dBm |
| Port 17 | 4.7 dBm |
| Port 18 | 10.7 dBm |
| Port 19 | 11.7 dBm |

3. If the system is going to adjust the Line driver supply of the whole board, then find the maximum output power required by your ports. In this case port 1 is the maximum, requiring 14.5 dBm.

4. Determine the Line Driver Supply Voltage (Vcc) required to supply this output level with as much overhead voltage as desired. An example formula for this is:

$$Vcc = (Vrms * pk2rms * (1 + Rs/Rt) Voverhead)/2$$

$$Vrms = \text{sqrt}(\text{output power}(w) * Rload).$$

Pk2rms for ADSL/VDSL2 is 5.5.
Voverhead is typically around 2V.
The/2 is for converting to a bridge type driver which has half the supply voltage and twice the current.
Rs and Rt for the ideal case are 100 ohms for VDSL2.

5. Adjust the output supply down to the calculated value for Vcc.

6. Power savings for each port can be calculated based on equations in the provided spreadsheet. Power savings are calculated based off the delta voltage of the supply and the output level of each port.

7. If additional ports train or are put out of service recalculate Vcc as required.

Example Spreadsheet Calculations
Line Driver Power Savings pk2rms
Calculations = 5.5
For ADSL/VDSL Rt = 100
Signals ohms

| Typical VDSL2 Output Powers | | | | | Overhead V | | | | |
|---|---|---|---|---|---|---|---|---|---|
| dBm output | power (w) | Vrms | Min. Vcc req'd | Min. Bridge Vcc | Voh n/p | Idc | LD pwr 2 v w 20 V | LD pwr overhead | Power Savings |
| | 0.007 | 0.8 | 9.255700 | 4.627850 | 15.3 | | | 0.134 | 0.044 | 0.08 |
| 8.5 | 08 | 414 | 946 | 473 | 7215 | 0.0067137 | 2744 | 4975 | 9777 |
| | 0.014 | 1.1 | 13.07335 | 6.536675 | 13.4 | | | 0.189 | 0.080 | 0.10 |
| 11.5 | 125 | 885 | 076 | 378 | 6332 | 0.0094829 | 6578 | 9524 | 8705 |
| | 0.028 | 1.6 | 18.46558 | 9.232794 | 10.7 | | | 0.267 | 0.150 | 0.11 |
| 14.5 | 18 | 787 | 962 | 81 | 6721 | 0.0133942 | 8841 | 4544 | 743 |
| | 0.056 | 2.3 | 26.08415 | 13.04207 | 6.95 | | | 0.378 | 0.284 | 0.09 |
| 17.5 | 23 | 713 | 228 | 614 | 7924 | 0.0189204 | 4082 | 6022 | 3806 |
| | | 3.1 | 34.78505 | 17.39252 | 2.60 | | | 0.504 | 0.489 | 0.01 |
| 20 | 0.1 | 623 | 426 | 713 | 7473 | 0.0252317 | 6339 | 3064 | 5328 |
| | | | Vrms * pk 2rms * (1+ Rs/Rt) | Min Vcc/2 | 20- Min Bridge Vcc | (Vrms/Rt)* Sqrt(2/pi) | 20 * Idc | (Min Bridge+ 2 v) Vcc * Idc | |

Power savings does not include any Ic type savings, which will be on the order of 1-2 ma * delta voltage.
Power with Vlhx = Idc * (Min Vcc/2 + Vohn/p) for 20 V Line Driver use 20 V.
Power savings is the difference between running the line driver with maximum bias voltage (e.g., to support 8b) and adjusting the bias voltage to just 2 voltage greater than needed min bridge Vcc based on the output signal power.
Power savings using this method are in the 0.1 watt range for ADSL/VDSL line driers/signal pk2rms type crest factors in a non-limiting example.

This application is related to copending patent applications entitled, "SMART BREAKER AND RELATED SYSTEM AND METHOD FOR PROTECTING ELECTRICAL DEVICES FROM FAULT CONDITIONS," and "SYSTEM AND METHOD FOR PROTECTING TELECOMMUNICATIONS DEVICE FROM POWER FAULTS," which are filed on the same date and by the same assignee, the disclosures which are hereby incorporated by reference.

Many modifications and other embodiments of the invention will come to the mind of one skilled in the art having the benefit of the teachings presented in the foregoing descriptions and the associated drawings. Therefore, it is understood That which is claimed is:

1. A communications system, comprising:
a telecommunications device having a transmitter that is connected to a communications line, wherein the transmitter has a line driver and is configured to couple communications signals to the communications line, and wherein the line driver is configured to adjust the communications signals based on a magnitude of a bias voltage;
a voltage source connected to said line driver and configured to provide the bias voltage to said line driver; and
a controller connected to said voltage source and having logic configured to adjust the bias voltage provided by the voltage source to a magnitude at which the line driver outputs the communications signals at a data rate that meets a minimum data rate specified by a service level agreement.

2. The communications system according to claim 1, wherein said voltage source comprises a first bias voltage source configured to provide a first bias voltage;
a second bias voltage source configured to provide a second bias voltage; and
wherein said line driver has a first mode based on the first bias voltage and a second mode based on the second bias voltage.

3. The communications system according to claim 1, wherein said telecommunications device comprises a Digital Subscriber Line Access Module (DSLAM).

4. The communications system according to claim 1, wherein the telecommunications device includes a plurality of line cards, each line card having a plurality of communications ports.

5. The communications system according to claim 1, wherein said controller is configured to compare an output data rate to the minimum data rate and reset any bias voltages based on the comparison.

6. The communications system according to claim 1, wherein said controller is configured to determine a lowest power decibel margin for a respective transmitter and calculate a minimum power required for a respective transmitter to provide the minimum data rate.

7. The communications system according to claim 6, wherein said controller is configured to adjust power at an access module in response to a change in the minimum data rate.

8. A communications system, comprising:
a line driver configured to output communications signals at two or more different data rates based on a magnitude of a bias voltage;
a first bias voltage source configured to provide a first bias voltage;
a second bias voltage source configured to provide a second bias voltage that differs from the first bias voltage; and
a controller connected to the first bias voltage source and the second bias voltage source, the controller including logic configured to adjust the bias voltage provided to the line driver by the first bias voltage source and the second bias voltage source, wherein the logic is configured to adjust the bias voltage to a magnitude at which the line driver outputs the communications signals at a data rate that meets a minimum data rate of a service level agreement.

9. The communications system according to claim 8, wherein the line driver is included in a Digital Subscriber Line Access Module (DSLAM).

10. The communications system according to claim 8, wherein said controller is configured to compare an output data rate to the minimum data rate and reset any bias voltages based on the comparison.

11. The communications system according to claim 8, wherein said controller is configured to determine a lowest power decibel margin and calculate a minimum power required to provide the minimum data rate.

12. The communications system according to claim 11, wherein said controller is configured to adjust power at an access module in response to a change in the minimum data rate.

13. A method, comprising:
providing, by telecommunications device having a transmitter that is connected to a communications line and configured to adjust communications signals based on a magnitude of a received bias voltage, communications signals on the communications line;
determining, by one or more controllers of the telecommunications device, a minimum data rate that is required to be provided on the communications line;
determining, by the one or more controllers, a particular bias voltage that will cause the transmitter to output communications signals at a data rate that meets the minimum data rate; and
adjusting, by the one or more controllers, a bias voltage provided to the transmitter to a magnitude based on the particular bias voltage.

14. The method according to claim 13, and further comprising comparing an output data rate of the transmitter to the minimum data rate and resetting the bias voltage.

15. The method according to claim 13, wherein determining the minimum data rate comprises determining the minimum data rate based on a service level agreement that specifies one or more data rates.

16. The method according to claim 15, and further comprising:
determining a lowest power decibel margin for a respective transmitter: and
calculating a minimum power required for a respective transmitter to provide the minimum data rate.

17. The method according to claim 16, and further comprising verifying that data rates for a telecommunications service requirement at all access modules have not changed.

18. The method according to claim 16, and further comprising adjusting power at an access module in response to a change in the minimum data rate.

19. The method according to claim 13, wherein said telecommunications device comprises a Digital Subscriber Line Access Module (DSLAM).

20. The method according to claim 13, and further comprising receiving, by the transmitter, power from a power supply comprising a low voltage source and high voltage source.

21. The method according to claim 13, wherein adjusting the bias voltage comprises adjusting an output voltage of each of two or more voltage sources by transmitting control signals from the one or more controllers to the two or more voltage sources.

22. The method according to claim 13, wherein the telecommunications device is included in an access module having one or more line cards, each line card comprising a plurality of communications ports.

\* \* \* \* \*

UNITED STATES PATENT AND TRADEMARK OFFICE
CERTIFICATE OF CORRECTION

PATENT NO.      : 8,693,679 B1
APPLICATION NO. : 12/841238
DATED           : April 8, 2014
INVENTOR(S)     : Brian C. Smith Page 1 of 1

It is certified that error appears in the above-identified patent and that said Letters Patent is hereby corrected as shown below:

In The Claims

In Column 12, In Line 18 (approx.), In Claim 13, after "by" insert -- a --.

Signed and Sealed this
Fifth Day of May, 2015

Michelle K. Lee
*Director of the United States Patent and Trademark Office*